March 26, 1929.   W. H. WHEATLEY   1,707,105
MILLING CUTTER FOR HELICAL OR SPIRAL AND STRAIGHT BEVEL GEARS
Original Filed March 30, 1927    2 Sheets-Sheet 1

Inventor
W. H. Wheatley
by Wilkinson & Giusta
Attorneys.

March 26, 1929.  W. H. WHEATLEY  1,707,105
MILLING CUTTER FOR HELICAL OR SPIRAL AND STRAIGHT BEVEL GEARS
Original Filed March 30, 1927   2 Sheets-Sheet 2
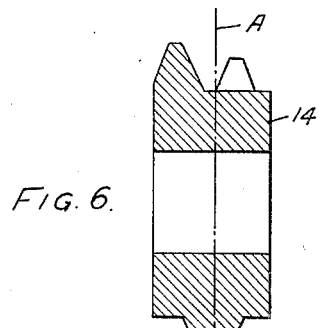
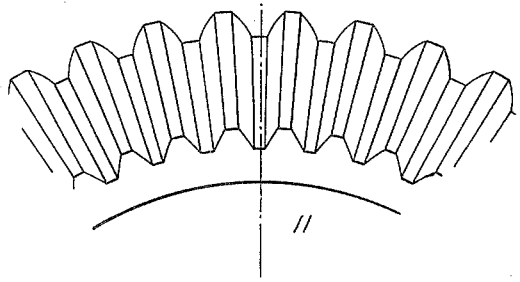
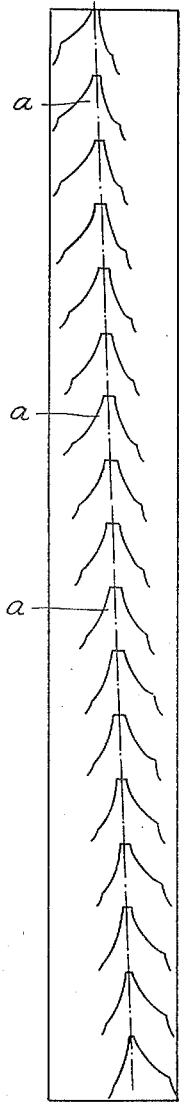
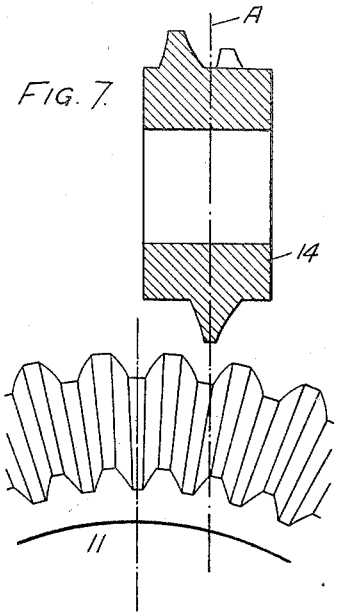
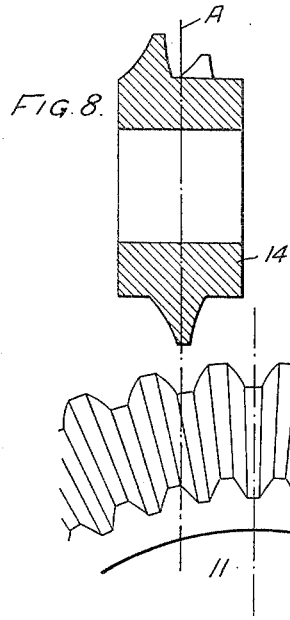

Patented Mar. 26, 1929.

1,707,105

UNITED STATES PATENT OFFICE.

WALTER HARRY WHEATLEY, OF LONDON, ENGLAND.

MILLING CUTTER FOR HELICAL OR SPIRAL AND STRAIGHT BEVEL GEARS.

Original application filed March 30, 1927, Serial No. 179,651, and in Great Britain July 21, 1926. Divided and this application filed November 26, 1927. Serial No. 235,966.

This invention relates to rotary helical cutters and to a method of making same and more particularly to a rotary cutter which is adapted to cut all the teeth of a helical or spiral or straight bevel gear in a single continuous operation, such for example, as the cutter described in the specification of the co-pending application for United States of America Letters Patent Serial No. 3,395, filed 19th January 1925. The invention is also a division of the co-pending application Serial No. 179,651 filed 30th March 1927.

In the aforesaid specification, a cutter of this type is described in which the cutting teeth arranged in a helical path are adapted to co-operate in pairs, each pair being shaped to cut to correct shape the opposite sides of the groove between a pair of teeth at a particular point in the length of the groove.

The objects of the invention are to produce an improved form of helical cutter and also a method of making the cutter, said method also being adapted to produce a cutter of the kind described in the aforesaid specification.

According to the present invention the improved cutter comprises a helix formed of a single thread which may extend completely round the cutter and providing a series of cutting teeth having cutting edges on each side, the cross sections of the teeth gradually diminishing in size from the centre of the helix to the two ends thereof, the pitch of the helix being equal to or less than the pitch at the smaller end of the bevel wheel or the like to be cut. The teeth of such a cutter when suitably shaped are adapted to cut all the teeth on a bevel wheel or other article in a single continuous operation by continuously rotating the cutter and a blank, the cutter making one revolution while the blank revolves through the pitch of one tooth to be cut and the cutter being fed once over the blank.

In a suitable method according to the invention, the teeth of the cutter are shaped by means of a master wheel as hereinafter fully described.

To enable the invention to be fully understood it will now be described by reference to the accompanying drawings in which:—

Fig. 6 is a view partly in section showing the roughed out cutter in position over the master wheel to produce a cutter for cutting straight toothed bevel gears.

Fig. 7 is a view similar to Fig. 6, but showing the arrangement for producing a cutter for cutting left-hand spiral teeth, and Fig. 8 is a view similar to Fig. 7, but showing the arrangement for producing a cutter for cutting right-hand spiral teeth.

Fig. 9 is a development of a cutter according to the invention.

Figure 1:
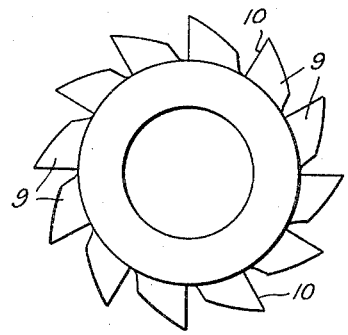
Fig. 1 is a side elevation of an improved cutter according to the invention.
Figure 2:
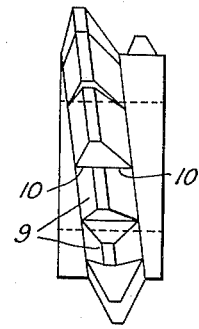
Fig. 2 is a front elevation thereof.

As shown in Figs. 1 and 2, the cutter comprises a series of teeth 9 arranged in a helical path with cutting edges 10 on each side. The cross sections of the teeth 9 diminish in size from the centre of the helix towards the two ends thereof, the pitch of the helix being equal to or less than the pitch at the smaller end of the bevel wheel or other object to be cut. A development of a cutter having seventeen teeth is shown in Fig. 9, the faces of the teeth being indicated by $a$ so that their shape is clearly shown.

If the teeth 9 are suitably shaped, all the teeth on a bevel wheel or other article can be cut in a single continuous operation as hereinbefore described.

Such a cutter for use in cutting a bevel gear may have its teeth shaped as follows:—

Figure 5:
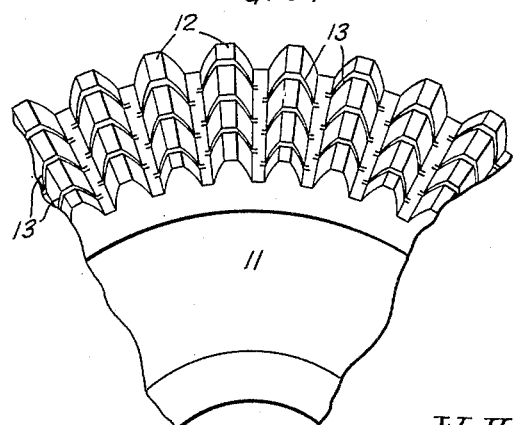
Fig. 5 is a view showing a portion of a straight toothed master bevel wheel.

As shown in Fig. 5, a master bevel gear wheel 11 is first cut and shaped on any suitable machine to correspond accurately to the gear which the cutter is designed to cut. In the example shown, the wheel 11 has straight teeth 12. The teeth 12 are formed with staggered serrations 13 to form cutting edges which may be slightly relieved and the wheel is then hardened and finished to correct shape preferably by grinding.

Figure 3:
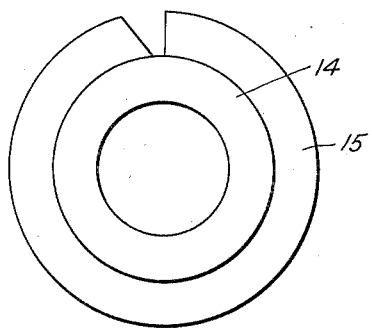
Figs. 3 and 4 are views similar to Figs. 1 and 2 respectively, of a roughed out cutter blank for forming a cutter according to the invention.
Figure 4:
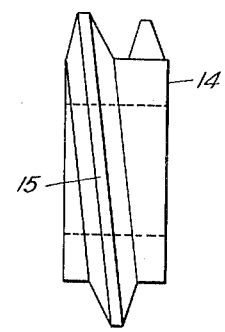

A cutter blank 14, Figs. 3 and 4, is roughed out and is formed with a rough helix 15, the pitch of which corresponds to the inside or minor pitch of the gear to be cut. The helix 15 may then be cross-cut to divide it into the desired number of teeth, or if desired this cross cutting may be left until the helix has been finally shaped by the master wheel.

The master wheel 11 is placed on the work head of a suitable gear cutting machine and the roughed out cutter 14 on the cutter arbor, the gearing of the machine being arranged at the required ratio. The roughed out cutter 14 is then fed once across the master wheel 11 at a suitable speed with its helix in mesh with the wheel teeth, the wheel 11 and cutter 14 being continuously rotated, the cutter making one revolution while the wheel turns through the pitch of one tooth.

The cutter is fed in a direction perpendicular to its axis, and with this axis moving in a plane parallel to a plane which is tangential to the cone containing the bottoms of the teeth of the wheel.

If the cutter to be made is required to cut straight teeth on bevel gears it is set up for generating purposes relatively to the master wheel as shown in Fig. 6, that is to say, so that the central plane of the cutter perpendicular to its axis indicated by the dotted line A contains the axis of the wheel 11.

If the cutter is required to cut left-hand spiral teeth the plane indicated by the line A must be offset with regard to the axis of the wheel 11 as shown in Fig. 7 and for right-hand spiral teeth the plane A must be offset as shown in Fig. 8.

The amount of this offset differs according to the pitch of the tooth to be cut.

During the shaping operation the cutting edges of the serrations 13 correctly shape the helix 15 for the particualr work for which it is intended and the helix is then cross cut to form the desired number of teeth, if this has not already been done, and the teeth are then relieved in such a manner that when ground they retain their correct shapes, after which the cutter is hardened.

It is preferable that the cutter when finished should have an odd number of teeth thereon so that when setting up the cutter for cutting a blank the central tooth of the cutter can be set on the central line of the blank as this tooth always follows the central line of a tooth space in the gear to be cut. Obviously the finished helix on the cutter may be cross-cut and the teeth so formed shaped to produce the cutter described in the aforesaid specification. Further, although the invention has been described in connection with the production of bevel gear wheels it will be understood that a rotary helical cutter for producing straight, spiral or helical teeth on any conical or flat surface may be generated according to the invention by making a suitable master wheel. For example, a cutter for forming the teeth on the flat face of a dog clutch may be generated and in this connection a flat plate may be regarded as a cone having an apex angle of 180°.

It is preferable that cutters intended for cutting spiral teeth should be generated from a spiral master gear wheel, but good results have been obtained from a straight toothed master gear wheel. The master wheel and the cutter are formed of steel or other suitable material.

It is to be understood that the term "master wheel" in the appended claims includes a bevel wheel or other toothed article such, for example, as the toothed plate of a clutch.

Having thus described the nature of my said invention and the best means I know of carrying the same into practical effect, I claim:—

1. A rotary helical cutter for cutting the teeth of helical, spiral and straight bevel wheels to true involute shape in a single continuous operation in the manner referred to, comprising a rotatable body, a helix formed of a single thread of varying pitch thereon providing a series of cutting teeth having cutting edges on each side, the cross sections of the points of the teeth diminishing in size from the center of the helix to the two ends thereof, the faces of the teeth being respectively so curved that each will produce a portion of an involute tooth surface by a hobbing method.

2. A rotary helical cutter as claimed in claim 1, having a single thread helix of a pitch less than the pitch of the smaller end of the work to be cut.

3. A rotary helical cutter as claimed in claim 1 having a single thread helix of a pitch equal to the pitch at the smaller end of the work to be cut.

In testimony whereof I have signed my name to this specification.

WALTER HARRY WHEATLEY.